(12) United States Patent
Cunto et al.

(10) Patent No.: US 12,055,893 B2
(45) Date of Patent: Aug. 6, 2024

(54) METHOD FOR PRODUCING A SURFACE OF REVOLUTION OF A CLOCK OR WATCH COMPONENT

(71) Applicant: ROLEX SA, Geneva (CH)

(72) Inventors: Giulio Cunto, Vernier (CH); Patrice Nagel, Vaulx (FR); Alexandre Oliveira, Amancy (FR)

(73) Assignee: ROLEX SA, Geneva (CH)

( * ) Notice: Subject to any disclaimer, the term of this patent is extended or adjusted under 35 U.S.C. 154(b) by 437 days.

(21) Appl. No.: 16/839,230

(22) Filed: Apr. 3, 2020

(65) Prior Publication Data

US 2020/0326656 A1 Oct. 15, 2020

(30) Foreign Application Priority Data

Apr. 12, 2019 (EP) ..................................... 19169113

(51) Int. Cl.
*G04B 15/14* (2006.01)
*B23K 26/00* (2014.01)
(Continued)

(52) U.S. Cl.
CPC .......... *G04B 15/14* (2013.01); *B23K 26/0093* (2013.01); *B23K 26/0624* (2015.10); *B23K 26/352* (2015.10); *G04B 31/06* (2013.01)

(58) Field of Classification Search
CPC ...... B23K 37/0241; B23K 9/12; B23K 9/287; B23K 9/127; B23K 26/0884; B23K 9/007; B23K 31/02; B23K 9/28; B23K 9/173; B23K 26/0624; B23K 26/355; B23K 2103/04; B23K 2103/08; B23K 2103/12; B23K 2103/14; B23K 2103/52; B23K 26/0006; B23K 26/359; B23K 26/0093; B23K 26/06; B23K 26/082; B23K 26/352;
(Continued)

(56) References Cited

U.S. PATENT DOCUMENTS

2003/0235385 A1 12/2003 Taylor et al.
2010/0254230 A1 10/2010 Takeuchi et al.
(Continued)

FOREIGN PATENT DOCUMENTS

CH 708998 A1 6/2015
CN 102017088 A 4/2011
(Continued)

OTHER PUBLICATIONS

European Search Report and Written Opinion dated Nov. 11, 2019 issued in counterpart application No. EP19169113; w/ English machine translation (total 16 pages).
(Continued)

*Primary Examiner* — Dana Ross
*Assistant Examiner* — Adam M Eckardt
(74) *Attorney, Agent, or Firm* — Seckel IP, PLLC

(57) ABSTRACT

Method for producing a surface of revolution of a clock or watch component comprising a step of machining, with a femtosecond laser beam, a first surface of the clock or watch component so as to obtain a second surface, in particular so as to obtain a second surface whose roughness Ra is less than 100 nm, or less than 70 nm, and then a tribofinishing step applied to the second surface so as to obtain the surface of revolution.

18 Claims, 5 Drawing Sheets

(51) Int. Cl.
  *B23K 26/0622* (2014.01)
  *B23K 26/352* (2014.01)
  *G04B 31/06* (2006.01)

(58) Field of Classification Search
  CPC .... B23K 26/361; B23K 9/32; B23K 26/0622; B23K 26/00; B23K 26/08; B23K 37/02; F16H 21/46; F16H 21/50; G05G 9/04737; Y10S 901/42; G04B 19/12; G04B 13/02; G04B 15/14; G04B 1/185; G04B 29/027; G04B 3/04; G04B 31/08; G04B 37/22; G04B 1/16; G04B 31/06; G04B 1/18; G04B 13/00; G04B 29/02; B44C 1/228; B44C 1/22; G04D 3/0082; G04D 3/0087; G04D 99/00; G04D 3/00; B41M 5/24; G04F 7/0823; G04F 7/0828; G04F 368/276; G04F 7/08; B25J 11/00; B25J 9/00; B25J 15/00; B25J 17/00; B05B 12/00; B05B 13/04; B23Q 1/44
  See application file for complete search history.

(56) References Cited

U.S. PATENT DOCUMENTS

| | | | |
|---|---|---|---|
| 2011/0045244 | A1 | 2/2011 | Mazur et al. |
| 2015/0003215 | A1 | 1/2015 | Hessler |
| 2015/0049593 | A1 | 2/2015 | Oliveira |
| 2015/0261187 | A1* | 9/2015 | Hessler ............... G04B 17/06 368/170 |
| 2017/0038734 | A1* | 2/2017 | Issartel ............. B23K 26/0624 |
| 2017/0357213 | A1* | 12/2017 | Linck .................. G04B 15/14 |
| 2018/0024500 | A1* | 1/2018 | Charbon ................ G04B 1/16 368/322 |
| 2018/0143592 | A1* | 5/2018 | Sogo ..................... C23C 28/44 |
| 2018/0169791 | A1 | 6/2018 | Miller |
| 2020/0269355 | A1 | 8/2020 | Ji et al. |

FOREIGN PATENT DOCUMENTS

| | | |
|---|---|---|
| CN | 109484075 A | 3/2019 |
| CN | 109514076 A | 3/2019 |
| EP | 2607971 A1 | 6/2013 |
| EP | 2717103 A1 | 4/2014 |
| EP | 3067757 A1 | 9/2016 |
| EP | 3258325 A1 | 12/2017 |
| JP | S54-010770 A | 1/1979 |
| JP | 2011-174905 A | 9/2011 |
| JP | 2011-208669 A | 10/2011 |
| JP | 2015-000408 A | 1/2015 |
| JP | 2015-226926 A | 12/2015 |
| JP | 2018-013479 A | 1/2018 |
| WO | 2015150552 A1 | 10/2015 |

OTHER PUBLICATIONS

Chinese Office Action and Search Report dated Jan. 17, 2024 in counterpart application No. CN 202010280093.3; w/ English machine translation (total 13 pages) (note: US20170038734 and US20180024500, D1 and D2 cited in the CN Office Action, D1, D3 and D2 in the CN Search Report, are not listed in this IDS since they are already of record in this application).

Japanese Office Action dated Mar. 26, 2024 in counterpart application No. JP 2020-067277; w/ English machine translation (total 14 pages).

* cited by examiner

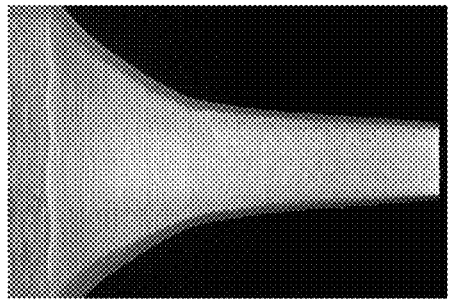 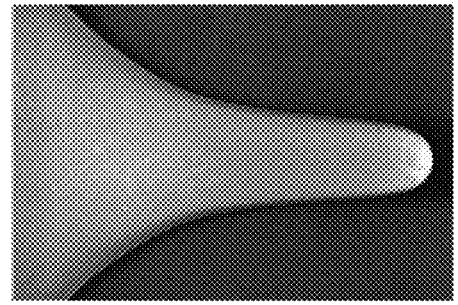
Fig. 8a  Fig. 8b
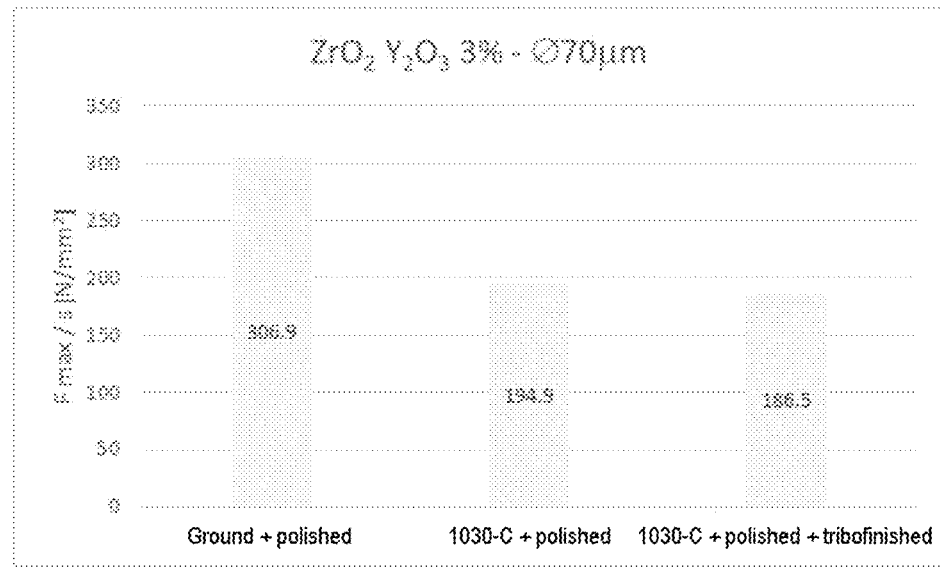
Fig. 9

METHOD FOR PRODUCING A SURFACE OF REVOLUTION OF A CLOCK OR WATCH COMPONENT

This application claims priority of European patent application No. EP19169113.8 filed Apr. 12, 2019, the content of which is hereby incorporated by reference herein in its entirety.

The invention relates to a method for producing a surface of revolution of a clock or watch component, more particularly a clock or watch component in ceramic. The invention also relates to a clock or watch component obtained by said method of production. The invention also relates to a clock or watch movement comprising said clock or watch component. The invention finally relates to a timepiece comprising said clock or watch component or said clock or watch movement.

The machining of clock or watch components made of engineering ceramics as described for example in patent application EP3258325 is a delicate operation requiring mastery of the interactions between the tool and the material, so as not to induce stresses in the ceramic, or new defects, notably surface defects, which would act as initiators of cracks that are detrimental to the impact toughness of the components.

The manufacture of clock arbors, less than 2 mm in diameter, proves particularly difficult, notably due to the presence of pivots with very small diameter (<200 microns, or even <100 microns) at the ends of the arbor. These pivots must have perfectly circular geometry, and dimensions that are scrupulously respected. They are provided for interacting with a bearing, and any geometric defect such as out-of-roundness or incorrect diameter will result in loss of chronometric performance of the movement in which this arbor is incorporated. This is particularly valid for the balance staff. The same applies if the surface of the pivot is not polished perfectly.

That is why the arbors according to the prior art are machined by bar turning from steels, and then the pivots are polished with form grinding wheels to obtain the final surface finish and shape.

However, this technique is difficult to apply to ceramic parts: bar turning by means of cutting tools or grinding wheels takes a very long time, and the tools wear rapidly. An alternative to machining of ceramics by grinding consists of machining ceramics by femtosecond laser ablation. The lasers used have ultra-short pulses (femtosecond laser) so as not to have a thermal effect on the machined material.

The equipment currently available, as used by the experts in this field, for example for making electrodes in hard metal or other elements of small size, generally metallic (such as microtweezers), use a laser emitting in the infrared IR (wavelength of 1030 nm). It has not been possible to obtain satisfactory results using this type of equipment: the surface roughness obtained at the end of machining are considerable, requiring special tribofinishing that takes a very long time to achieve the required surface roughness, and despite geometric conformity of the parts, the performance in respect of bending strength does not meet expectations.

The bending strength of pivots of arbors of identical geometry, made by grinding or by femtosecond laser machining according to the prior art, was measured by applying a force by means of a blade at a given distance from the end of a pivot, the part being supported at the level of a bearing surface forming the interface between said pivot and the main body of the arbor.

The bending strength of pivots of different arbors is represented in FIG. 9, which indicates the levels of ultimate bending stresses of the pivots of each of these arbors. The stresses measured are correlated with the cross-sectional area of each of the pivots at the place of application of the maximum force initiating rupture.

As illustrated in FIG. 9, parts ground from 3% yttriated zirconia (3% $ZrO_2Y_2O_3$) are thus stronger than parts in 3% yttriated zirconia (3% $ZrO_2Y_2O_3$) machined by laser according to the femtosecond laser machining process known from the prior art, whether they were subsequently polished or polished and then tribofinished.

It therefore seems that ceramic clock arbors machined by femtosecond laser may display unsatisfactory behavior in use, even though they are dimensionally correct.

The aim of the invention is to supply a method for producing a surface of revolution of a clock or watch component in ceramic, improving on the methods known from the prior art. In particular, the invention proposes a method for making a reliable component, notably a balance staff or an arbor of an escapement wheel or an arbor of a seconds wheel or any other arbor forming part of a mobile of a finishing chain of a clock or watch movement, in a repeatable manner. The present invention further aims to accelerate ceramic machining and make it more reliable, so as to obtain components of the arbor type with the required dimensions (diameter <2 mm, with micron tolerance) while guaranteeing adequate impact strength.

According to the invention, a method of production is defined in point 1 below.

1. A method for producing a surface of revolution of a clock or watch component, said method comprising:
   a step of machining, with a femtosecond laser beam, a first surface of the clock or watch component so as to obtain a second surface, in particular so as to obtain a second surface whose roughness Ra is less than 100 nm, or less than 70 nm, and then
   a tribofinishing step applied to the second surface so as to obtain said surface of revolution.

Various embodiments of the method are defined in points 2 to 12 below.

2. The method as defined in point 1, wherein the clock or watch component is an arbor, notably a balance staff or an arbor of an escapement wheel or an arbor of a seconds wheel, and/or wherein the diameter of the component is less than or equal to 2 mm.
3. The method as defined in one of the preceding points, wherein the surface of revolution is a surface of a pivot of the clock or watch component and/or wherein the diameter of the surface of revolution is less than or equal to 200 µm, or even less than 100 µm.
4. The method as defined in one of the preceding points, wherein the surface of revolution is made of ceramic.
5. The method as defined in the preceding point, wherein the ceramic is a zirconia, an yttriated zirconia, notably a 3% yttriated zirconia, a monocrystalline alumina or an alumina-zirconia combination.
6. The method as defined in one of the preceding points, wherein the machining step comprises a turning phase.
7. The method as defined in one of the preceding points, wherein the laser beam is an infrared laser beam, notably an infrared laser beam having a wavelength between 800 nm and 1100 nm, in particular a wavelength of 1030 nm±5 nm, or a green laser beam, notably a green laser beam having a wavelength between 500 nm and 540 nm, in particular a wavelength of 515 nm±2.55 nm, or an ultraviolet laser beam, notably an ultraviolet laser beam having a wavelength under 400 nm, in particular a wavelength of 343 nm±25 nm, or a blue laser beam, notably a blue laser beam having a wavelength between 400 nm and 480 nm.
8. The method as defined in one of the preceding points, wherein the laser beam has an energy between 0.001 mJ and 2 mJ, preferably between 0.01 mJ and 0.5 mJ, or even between 0.04 and 0.05 mJ.
9. The method as defined in one of the preceding points, wherein the laser beam scans the first surface following a helical trajectory.
10. The method as defined in one of the preceding points, wherein the laser beam has a diameter between 5 μm and 100 μm, preferably between 10 μm and 60 μm, or even between 15 μm and 25 μm.
11. The method as defined in one of the preceding points, wherein the tribofinishing step takes less than 20 hours, preferably less than 10 hours.
12. The method as defined in one of the preceding points, wherein the tribofinishing step comprises a step of bulk polishing and/or comprises the use of diamond abrasive particles and/or the size of which is of the order of 1 μm.

According to the invention, a clock or watch component is defined in points 13 or 14 below.
13. A clock or watch component, notably a balance staff or an arbor of an escapement wheel or an arbor of a seconds wheel, obtained by carrying out the method of production as defined in one of the preceding points.
14. A clock or watch component, notably a clock or watch component made of ceramic, having a surface of revolution whose roughness Ra is less than or equal to 15 nm and whose breaking stress in shear is above 200 N·mm$^{-2}$, or even above 250 N·mm$^{-2}$.

According to the invention, a clock or watch movement is defined in point 15 below.
15. A clock or watch movement comprising a clock or watch component as defined in point 13 or 14.

According to the invention, a timepiece is defined in point 16 below.
16. A timepiece, notably a wristwatch, comprising a clock or watch component as defined in point 13 or 14 and/or a clock or watch movement as defined in the preceding point.

The appended figures show, as an example, an embodiment of a timepiece according to the invention.

Figures 4A, 4B, 4C:
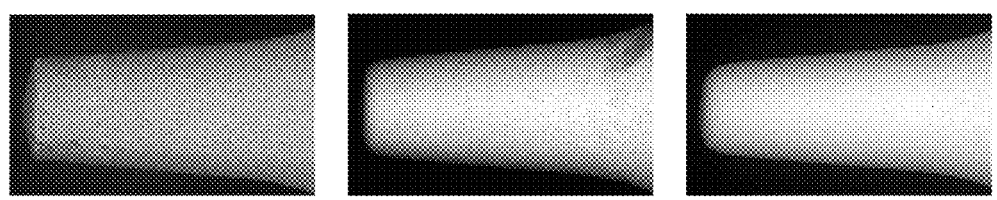

FIGS. 4a, 4b and 4c are photographs of a balance staff pivot in 3% yttriated zirconia after IR laser machining (Ref. 1030), after 10 h of tribofinishing following said machining and after 20 h of tribofinishing following said machining, respectively.

Figure 5:
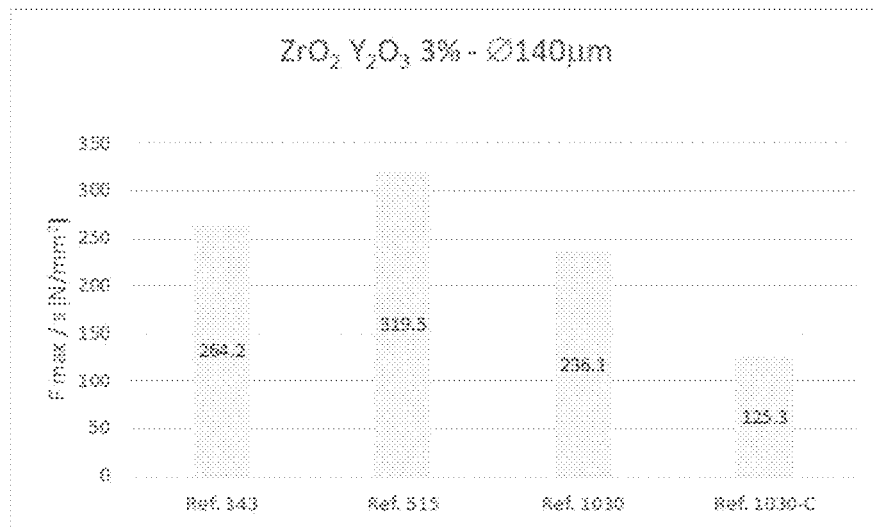

FIG. 5 is a graph showing the values of ultimate bending stresses of different balance staffs in 3% yttriated zirconia obtained by different types of laser machining.

Figure 6A:
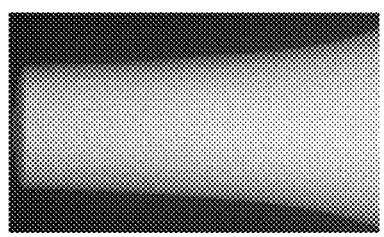
Figure 6B:
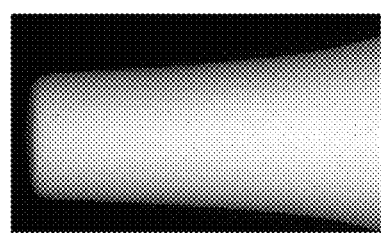

FIGS. 6a and 6b are photographs of a balance staff pivot in 3% yttriated zirconia after green laser machining (Ref. 515) and after 10 h of tribofinishing following said machining, respectively.

Figure 7A:
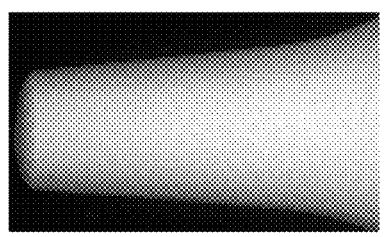
Figure 7B:
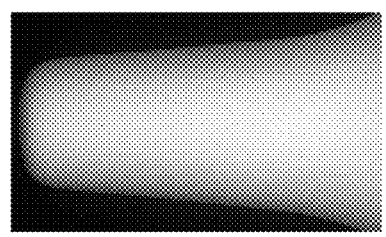

FIGS. 7a and 7b are photographs of a balance staff pivot in 3% yttriated zirconia after UV laser machining (Ref. 434) and after 10 h of tribofinishing following said machining, respectively.

FIGS. 8a and 8b are photographs of a pivot of a balance staff in 3% yttriated zirconia after machining by grinding and after 10 h of tribofinishing following said machining, respectively.

FIG. 9 is a graph showing the values of ultimate bending stresses of different balance staffs in 3% yttriated zirconia obtained by different methods of production.

Figure 10:
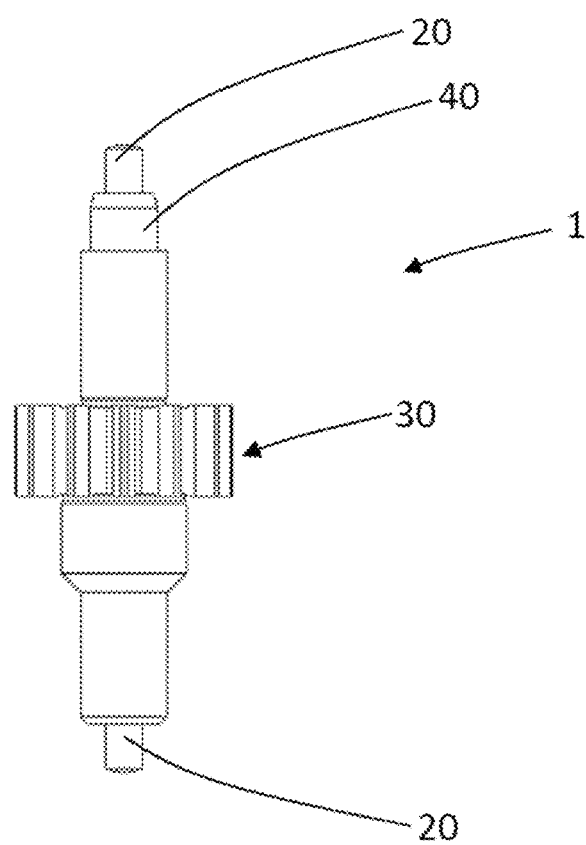

FIG. 10 is a view of another embodiment of a clock or watch component.

Figure 1:
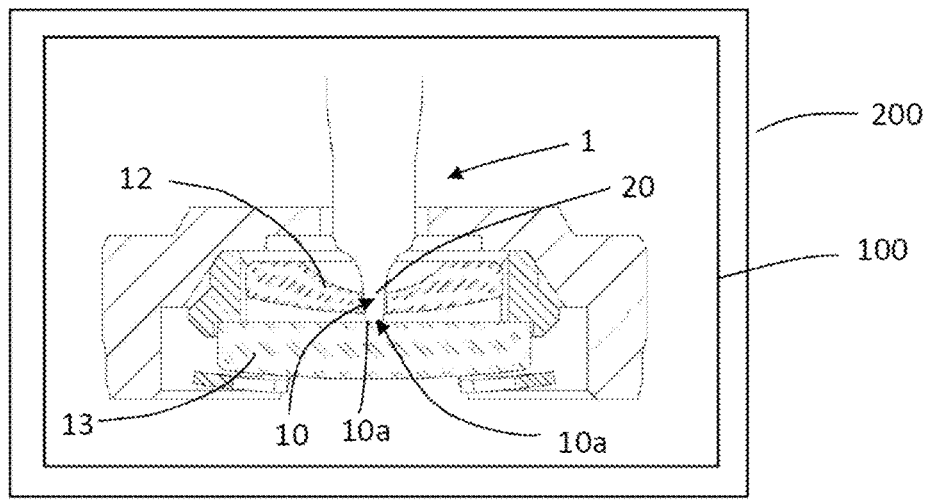
FIG. 1 is a schematic view of the embodiment of a timepiece comprising an embodiment of a clock or watch component.

An embodiment of a timepiece 200 according to the invention is described below, referring to FIG. 1.

The timepiece 200 is for example a wristwatch. The timepiece preferably comprises a watch case and a watch movement 100.

The watch movement may be a mechanical movement, notably an automatic movement.

The watch movement comprises an embodiment of a watch component 1.

The watch component is for example an arbor, notably a balance staff of a watch oscillator of the balance wheel/spiral spring type or an arbor of an escapement wheel or an arbor of a seconds wheel. The diameter of the component, in particular the maximum diameter of the component, is for example less than or equal to 2 mm.

The watch component preferably comprises a pivot 10. "Pivot" means a portion of a component, in particular of an arbor, provided for interacting, notably interacting by contact, with a bearing, in particular a jewel bearing. This pivot may have at least one portion of cylindrical or conical or truncated geometry. The pivot is preferably arranged at one end of the arbor. The pivot may, for example, be formed in the continuation of an arbor portion comprising a surface with a curved generatrix.

The watch movement also comprises a bearing 12, or even several bearings mounted on an element of the movement, notably on a frame of the movement.

The watch component is for example intended to interact, notably to interact by contact, with the bearing 12. In particular, the watch component interacts with the bearing 12 at the level of the pivot 10. Even more particularly, the watch component interacts with the bearing 12 at the level of a surface of revolution 20 located at the level of the pivot 10. The diameter of a section of the surface of revolution 20 is for example less than or equal to 200 μm, or even less than or equal to 100 μm. Optionally, the pivot may be delimited axially by an endstone 13 at one end 10a of the pivot 10. The elements 12 and 13 may be arranged within one and the same element having the form of a shock absorber body. In this particular case, the arbor is preferably a balance staff or an arbor of an escapement wheel.

The bearing comprises a bore. The bore and the surface of revolution are dimensioned and/or configured to have a limited functional clearance, for example of the order of 7 to 17 μm.

Advantageously, the watch component comprises two pivots 10 for interacting with two bearings 12 so as to guide the watch component relatively to the bearings and more generally relatively to the watch movement element on which the bearings are mounted.

Advantageously, the watch component or a part of the watch component is made of ceramic. The surface of revolution 20 is made of ceramic, i.e. the surface of revolution is formed or is located on a ceramic part of the component.

Preferably, the ceramic is a zirconia, in particular an yttriated zirconia, notably a 3% (by weight) yttriated zirconia, a monocrystalline alumina or an alumina-zirconia combination (ATZ).

Thus, preferably, all or part of the watch component is made of ceramic, and comprises the surface of revolution 20 whose roughness Ra is less than or equal to 15 nm. More preferably, the watch component comprises a pivot comprising said surface of revolution. Advantageously, the ultimate stress in shearing of the pivot of the component is above 200 N·mm$^{-2}$, or even above 250 N·mm$^{-2}$.

One embodiment of a method for producing the surface of revolution 20 of the watch component 1 in ceramic is described below.

The method of production comprises:
- a step of machining, with a femtosecond laser beam, a first surface of the watch component so as to obtain a second surface, in particular so as to obtain a second surface whose roughness Ra is less than 100 nm, or less than 70 nm, and then
- a tribofinishing step applied to the second surface so as to obtain said surface of revolution.

This method makes it possible to obtain clock or watch components comprising a surface of revolution in ceramic, which is geometrically correct and has a suitable roughness after tribofinishing for a reasonable time, typically of the order of 10 hours. This tribofinishing step must be parameterized so as not to alter the geometry of the surface, notably so as to avoid excessive rounding of the end of the pivot or pivots comprising said surface of revolution in order to maintain control of the contact zone between the pivot and the bearing. It is therefore essential that the initial roughness before this step is low enough to allow a tribofinishing step of a reasonable duration. For example, the roughness Ra of the surface of revolution 20 finally obtained is of the order of 10 to 15 nm.

A method of this kind provides an alternative to machining the ceramic by grinding and consists of machining the ceramic by femtosecond laser ablation without reducing its mechanical durability. The lasers used have ultra-short pulses (femtosecond laser) so as not to have a thermal effect on the machined material, in suitable wavelengths so as not to affect the structure of the material.

Advantageously, the method allows production not only of the surface of revolution 20 of the watch component 1, but of the whole surface of the pivot comprising said surface 20, or even of all the surfaces of the watch component.

Various tests were carried out on different materials of balance staffs, such as a zirconia, an yttriated zirconia, a monocrystalline alumina (sapphire) or an alumina-zirconia combination (ATZ). More particularly, 3% yttriated zirconia was used.

Preferably, the laser beam emits in the infrared with a wavelength between 800 nm and 1100 nm, ideally 1030 nm±5 nm or in the green with a wavelength between 500 nm and 540 nm, ideally 515 nm±2.55 nm or in the blue with a wavelength between 400 nm and 480 nm or in the ultraviolet with a wavelength under 400 nm, ideally 343 nm±25 nm.

Preferably, the machining step comprises a turning phase, i.e. a machining step in which the watch component is rotated about a rotation axis and in which the laser beam is movable relative to this rotation axis. Any other kinematics is conceivable from the moment when the laser beam sweeps a surface of the component.

Preferably, the laser beam has an average energy per pulse (also called fluence) between 0.001 mJ and 2 mJ, preferably between 0.01 mJ and 0.5 mJ, or even between 0.04 and 0.05 mJ for the materials and the dimensions tested.

The degree of lateral overlap, i.e. perpendicularly to the direction of travel or perpendicularly to the arbor of the component, is defined by the rotary speed of the part and the frequency of the laser, and may be defined between 0% and 99.9%. It is preferably between 20% and 99.9%, and ideally between 99.6% and 99.8%.

The degree of longitudinal overlap is defined by the speed of scanning or of travel of the beam and the frequency of the laser, and may be defined between 0 and 99.9%. It is preferably between 20 and 99.9%, and ideally between 20% and 80.8%. It should be noted that a degree of longitudinal overlap of 100% corresponds to executing parting-off of the part.

Preferably, the laser beam scans the first surface following a helical trajectory, i.e. the helical trajectory can be drawn on the machined revolution surface.

Preferably, the laser beam is applied in directions tangential to the first surface, or in directions approximately tangential to the first surface. Alternatively, the laser beam may be applied in directions normal to the first surface, or in directions approximately normal to the first surface.

Preferably, the laser beam has a diameter between 5 μm and 100 μm, preferably between 10 μm and 60 μm and ideally between 15 μm and 25 μm for the materials and the dimensions tested. The diameter is measured perpendicularly to the beam axis at a location of impact of the beam on the first surface.

Preferably, the tribofinishing step takes less than 20 hours, and preferably less than 10 hours.

Preferably, the tribofinishing step comprises a step of bulk polishing. Preferably, the tribofinishing step comprises the use of diamond abrasive particles whose size is of the order of 1 μm. Preferably the tribofinishing step comprises the use of a ceramic carrier in the form of beads of size between 125 and 250 μm with addition of water and an additive.

Various tests were also carried out with variation of the nature of the laser beam. In particular, several lasers operating in the infrared (IR, wavelength 1030 nm), in the green (wavelength 515 nm) or in the ultraviolet (UV, wavelength 343 nm), with equipment allowing parameterization of the relative speeds of scanning of the laser beam and of rotation of the watch component, were tested. However, the parameterization was kept identical (indicated "ES") for all the tests presented below, in particular at the level of the fluence of the lasers, which was kept constant between the different beams, as well as the speeds of scanning of the beam and of rotation of the watch component.

Figure 2:
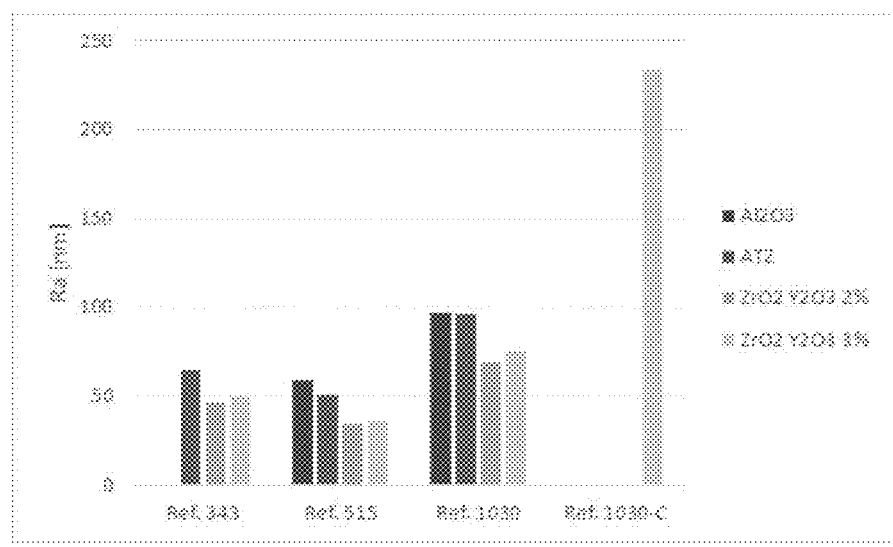
FIG. 2 is a graph showing values of surface roughness Ra of the surfaces obtained by different laser machining processes of different ceramics.

As indicated on the graph in FIG. 2, green lasers (Ref. 515) and UV lasers (Ref. 343) give satisfactory surface roughness at the end of machining, of the order of 50 nm, for various engineering ceramics. The IR laser (Ref. 1030) can give surface roughness at the end of machining of the order of 50 to 100 nm, for various engineering ceramics, provided that the configuration of the equipment allows optimization of the parameters relative to the equipment and parameters known from the prior art (Ref. 1030-C).

Figure 3:
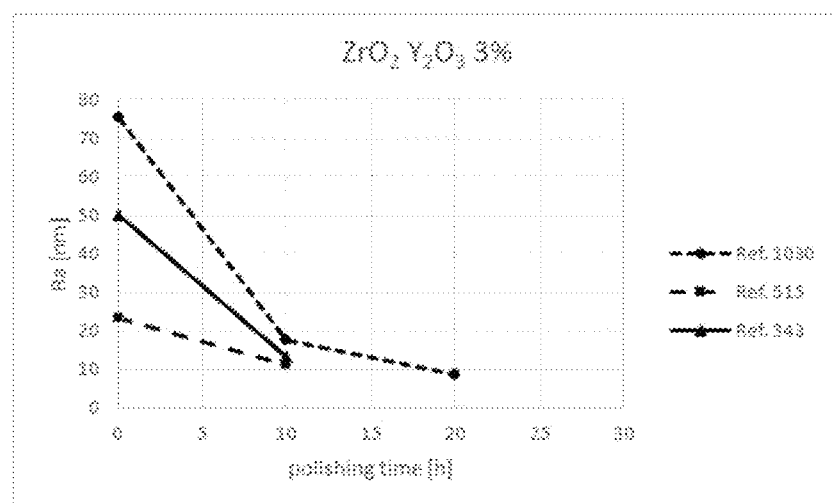
FIG. 3 is a graph showing the variations of the values of surface roughness Ra of the surfaces obtained by different laser machining processes of 3% yttriated zirconia.

As indicated in FIG. 3, the watch components in 3% yttriated zirconia machined with the green (Ref. 515), UV (Ref. 343) and IR (Ref. 1030) lasers and tribofinished by mechanical stressing carried out with an abrasive mixture, vibrated in a tank, by means of diamond abrasive particles about 1 μm in diameter combined with a ceramic carrier in the form of beads between 125 μm and 250 μm in diameter, with addition of water and an additive, can all reach the suitable final roughness of 10 to 15 nm. This suitable final roughness is reached after 10 hours of tribofinishing starting from the watch components machined with the green (Ref. 515) and UV (Ref. 343) lasers. It is necessary to carry out 20 hours of polishing starting from the watch components machined with the IR laser (Ref. 1030) to obtain an equivalent roughness. The consequence of this, as can be seen in FIGS. 4a, 4b and 4c (representing a balance staff pivot in 3% yttriated zirconia after IR laser machining (Ref. 1030), after 10 h of tribofinishing following said machining and after 20 h of tribofinishing following said machining, respectively), is a change in the dimensions and geometry of the components, notably at the level of the end pivots, thus affecting the operation of the watch component. FIGS. 6a and 7a show the appearance of a pivot in 3% yttriated zirconia just after the step of machining with a green laser and with a UV laser, respectively. FIGS. 6b and 7b show the appearance of a pivot in 3% yttriated zirconia after the tribofinishing step applied to the pivots as illustrated in FIGS. 6a and 7a, respectively. The final surface roughness of the components illustrated in FIGS. 4c, 6b and 7b are satisfactory, but the end of the pivot in FIG. 4c is rounded; this change of geometry will affect the chronometric performance of the watch equipped with such a pivot.

The results of the observations and of the dimensional measurements were confirmed by measurements of bending strength to ensure that the function of the watch components of the arbor type can be fulfilled.

As indicated in the graph in FIG. 5, the bending strength of the pivots, measured by the force applied by a blade at a fixed distance from the end of the pivot, relative to the cross-sectional area of the pivot at the place of application of the blade, is greater for the watch components machined with the green laser (Ref. 515) relative to the clock or watch components machined with the IR laser (Ref. 1030) or UV laser (Ref. 343). This test was carried out for watch components in 3% yttriated zirconia.

It therefore seems advantageous to work in the region of green light (515 nm) or UV light (343 nm) to obtain the lowest possible roughness at the end of machining and the highest bending strength.

To simplify and clarify the description, "watch component" means the component produced by carrying out the method regardless of its stage of production, i.e. "watch component" means the component before laser machining, after laser machining or else after tribofinishing, even though the component undergoes changes in the course of the method.

The surface of revolution 20 is described here specifically at the level of the pivot of a balance staff, but any other surface of revolution of a watch arbor for which a particular geometry and/or roughness should be achieved may also be carried out by the same method. In particular, the method described above makes it possible to produce an arbor of an escapement wheel or an arbor of a seconds wheel or any other arbor forming part of a mobile of a finishing chain of a watch movement.

Such an arbor may comprise a first toothed portion 30. This portion 30 may be integral with the arbor. Thus, the arbor may be in the form of a pinion shaft. Said pinion shaft may comprise a second portion 40 for receiving a wheel plate. In particular, said pinion shaft may be manufactured entirely in ceramic.

Alternatively, the first toothed portion 30 may be applied on a third portion for receiving the arbor, for example by press-fitting. In this case, the first toothed portion 30 may be metallic.

The maximum diameter of the first toothed portion 30 is for example less than or equal to 2 mm. The toothing of the first portion 30 may have a conventional profile, such as a Treybal profile.

Compared to the prior art, which involves using cutting tools, the use of a femtosecond laser beam (green or UV) gives a time saving and optimization of the properties of the final component, provided certain machining conditions are respected. Moreover, it is possible that a femtosecond laser beam operating in the IR may also allow satisfactory results to be obtained in certain conditions.

Throughout this document, "ceramic" means a homogeneous or approximately homogeneous material, including at the microscopic level.

Preferably, the ceramic is homogeneous in at least one direction, or even in all directions, over a distance greater than 6 µm, or even greater than 10 µm, or even greater than 20 µm.

More preferably, the ceramic does not have nonceramic material in at least one direction, or even in all directions, over a distance greater than 6 µm, or even greater than 10 µm, or even greater than 20 µm.

Preferably, the fact that the component and/or part of component is made of ceramic signifies that this component or this part is completely in ceramic. More preferably, the fact that the component and/or part of component is made of ceramic excludes the component or part of component being made of a material made up of grains of ceramic bound together by a nonceramic matrix, such as a metallic matrix.

The method described is particularly suitable for making a component or a part of a component in ceramic. Of course, a metal component, for example a component, notably an arbor, made of tungsten or of tantalum or of any other hard metal that is difficult to machine by conventional means, could benefit from such a method.

The invention claimed is:

1. A method for producing a tribofinished surface of revolution of a clock or watch component, the method comprising:
    providing the clock or watch component having a first surface which is a surface of revolution having a first roughness,
    performing a first surface treatment including machining, with a femtosecond laser beam, the first surface so as to transform the first surface into a machined second surface of revolution having a second roughness wherein, in the machining, the first roughness of the first surface is reduced to the second roughness of 100 nm or less, and then
    performing a second surface treatment including performing tribofinishing applied to the machined second surface having the second roughness so as to transform the second surface into the tribofinished surface of revolution having a final roughness.

2. The method as claimed in claim 1, wherein the clock or watch component is an arbor.

3. The method as claimed in claim 1, wherein the surface of revolution is a surface of a pivot of the clock or watch component.

4. The method as claimed in claim 1, wherein the surface of revolution is made of ceramic.

5. The method as claimed in claim 4, wherein the ceramic is a zirconia, an yttriated zirconia, a monocrystalline alumina or an alumina-zirconia combination.

6. The method as claimed in claim 1, wherein the machining step comprises a turning phase.

7. The method as claimed in claim 1, wherein the laser beam is an infrared laser beam, or a green laser beam, or an ultraviolet laser beam, or a blue laser beam.

8. The method as claimed in claim 1, wherein the laser beam has an energy in a range of from 0.001 mJ to 2 mJ.

9. The method as claimed in claim 1, wherein the laser beam scans the first surface along a helical trajectory.

10. The method as claimed in claim 1, wherein the laser beam has a diameter in a range of from 5 µm to 100 µm.

11. The method as claimed in claim 1, wherein the tribofinishing takes less than 20 hours.

12. The method as claimed in claim 1, wherein the tribofinishing comprises polishing with diamond abrasive particles.

13. The method as claimed in claim 1, wherein the second surface has a roughness Ra of less than 100 nm.

14. The method as claimed in claim 1, wherein the clock or watch component is selected from the group consisting of a balance staff, an arbor of an escapement wheel, and an arbor of a seconds wheel.

15. The method as claimed in claim 1, wherein a diameter of the clock or watch component is less than or equal to 2 mm.

16. The method as claimed in claim 1, wherein a diameter of the surface of revolution is less than or equal to 200 µm.

17. The method as claimed in claim 1, wherein, in the tribofinishing, the second roughness of the machined second surface is reduced to the final roughness less than or equal to 15 nm.

18. The method as claimed in claim 1, wherein the tribofinishing comprises mass polishing.

* * * * *